INVENTOR
M. S. GLASS
BY [signature]
ATTORNEY

INVENTOR
M. S. GLASS
BY
James W. Falk
ATTORNEY

INVENTOR
M. S. GLASS
BY
[signature]
ATTORNEY

United States Patent Office 2,787,711

Patented Apr. 2, 1957

2,787,711

HIGH FREQUENCY OSCILLATOR

Myron S. Glass, West Orange, N. J., assignor to Bell Telephone Laboratories, Incorporated, New York, N. Y., a corporation of New York Application March 4, 1954, Serial No. 414,130

14 Claims. (Cl. 250—36)

This invention relates to high frequency oscillators and more particularly to such oscillators of the magnetron type.

A tightly coupled multi-circuit oscillating system, such as a multicavity resonator, can oscillate in a number of modes or frequencies. There is a preferred and most stable mode, referred to as the $\pi$-mode, in which it normally operates as a generator. Under certain conditions of loading and driving circuits, however, a pulsed magnetron may commence oscillation in one of its other modes, referred to as spurious or doublet modes, thereby degrading its performance as a generator. This type of misbehavior has become known as "moding" and in pulsed magnetrons causes either partially missing or completely missing lines in the desired mode spectrum.

It is known that heavy loading of a mode of oscillation will retard the build-up of oscillations in that mode and that correspondingly light loading will favor the build-up of oscillations in a mode. When a magnetron is connected to a load it is evident that the principal mode of oscillation must be rather heavily loaded to extract power from the oscillator. If a spurious mode is lightly loaded it may thus gain an advantage over the normal mode of oscillation, even to the extent of excluding the normal mode from a pulse cycle. A discussion of the competition that exists between the various modes at the start of the oscillation build-up and of moding in general may be found in the chapter entitled "Transient behavior" by Rieke in "Microwave Magnetrons" (Collins, ed., MIT Series, volume 6) and at section 10.6 in the article "The magnetron as a generator of centimeter waves," by Fisk, Hagstrum, and Hartman at page 253, volume 25 of the Bell System Technical Journal (April 1946).

The spurious modes are doublet modes, the two components of which may be slightly separated in frequency; generally the two components will not be equally loaded. When one of the doublet components is heavily loaded and the other lightly loaded, oscillations may build up readily in the lightly loaded component causing moding. It has therefore been suggested to alleviate the moding problem by assuring equal loading of the doublet components of the spurious mode nearest in frequency to the $\pi$-mode of the magnetron, and therefore the spurious mode in which oscillations are most likely to commence. In devices such as disclosed in application Serial No. 348,438, filed April 13, 1953, of R. C. Fletcher and S. Millman, equal loading of the doublet components of a spurious mode is attained by enlarging the diameter of specific ones of the resonator bores. In devices such as disclosed in application Serial No. 348,218, filed April 13, 1953, of J. P. Molnar and in application Serial No. 348,365, filed April 13, 1953, of M. S. Glass, this equal loading of the doublet components is assured over the frequency range of a tunable magnetron by specific variations in the diameter of tuning pins inserted in certain of the resonator bores of the magnetron to attain tuning. The general considerations behind the introduction of reactances of perturbations in the magnetron circuit to attain the above stated results are set forth in detail in application Serial No. 348,526, filed April 13, 1953, of M. S. Glass and L. R. Walker.

Having thus attained an equalization in the loading of the two components of the spurious doublet mode, it is desired to make the difference between this loading and the loading of the $\pi$-mode of oscillation as great as possible during the build-up oscillation in the magnetron. This may be done by selectively unloading the $\pi$-mode of oscillation and/or selectively loading the degenerate mode of oscillation. In application Serial No. 376,022, filed July 8, 1953, of M. S. Glass, J. P. Molnar, H. G. Och, and W. H. Thatcher there is disclosed the employment of a gaseous discharge device, of the type known as an ATR tube, in the output waveguide of the magnetron at a distance such as to present a short circuit to the $\pi$-mode of oscillation during build up of the oscillation, thereby completely decoupling it from the load, while not decoupling the spurious mode of oscillation. Upon build-up of oscillation in the magnetron, the discharge device fires and the magnetron is coupled to the load. In this prior application the spurious mode is not additionally loaded.

It is a general object of this invention to prevent moding of an oscillating circuit.

It is a further object of this invention to prevent moding in both tunable and single frequency magnetrons.

It is another object of this invention to improve the operating performance of oscillating circuits capable of oscillating in more than one mode, such as magnetrons.

These and other objects of this invention are attained in specific embodiments in which selective resonant filters are placed in the output circuit of the magnetron to provide normal loading for the desired or $\pi$-mode of oscillation but heavier than normal loading for the undesired spurious mode of oscillation. Because of the short wavelength of the radio frequency energy generated by the magnetrons, the selective filter is placed very close to the resonator system and specifically within the vacuum envelope of the magnetron. The filter accordingly should advantageously be very compact.

In accordance with an aspect of this invention, a waveguide iris filter is positioned in the output waveguide of a magnetron but within the vacuum envelope thereof selectively to load the spurious mode closest in frequency to the $\pi$-mode of oscillation. The resonant iris behaves as a shunt resonant circuit, resonant at the frequency of the $\pi$-mode of the magnetron. It may therefore be introduced into the output circuit of the magnetron without affecting the $\pi$-mode loading. At the frequency of the nearest spurious mode, however, it introduces a large disturbance and this disturbance is phased so as to load heavily the spurious mode. The magnitude of the disturbance depends on the design parameters of the resonant iris, and the phase in which the reflection is presented to the magnetron depends on the distance of the iris from the magnetron resonator.

It is appreciated that any metallic projection which partially obstructs a smooth waveguide introduces susceptance at the region of the projection, in parallel with the admittance of the guide. Familiar examples include the tuning screw and probe-type standing wave introducer. An iris, consisting of a transverse septum of metal with a perforation or window, is a special type of waveguide obstacle. In accordance with one aspect of this invention, the characteristics of the iris are utilized to assure the desired selective moding. Specifically it is a characteristic of an iris that it can introduce susceptance within a wide range of values, either positive or negative. It can also be resonant at a particular frequency so that it exhibits the characteristics of a shunt resonant circuit attached to the line. Accordingly, if resonant at the $\pi$-mode frequency it introduces no susceptance at the frequency of resonance and therefore does not load the π-mode. At other frequencies it introduces susceptance, the magnitude of which is dependent on the design of the iris and which increases with increase of deviation from the resonant frequency.

If the magnetron is tunable over a band of frequencies, a pair of resonant irises may be employed in accordance with another specific illustrative embodiment of this invention. The irises are spaced apart and spaced from the output resonator of the magnetron so that the summation of their impedances when transposed to the output resonator is represented on a Smith chart by a small curve around the characteristic impedance circle for the output line for the desired mode frequencies while providing a selective loading impedance for the degenerate mode frequencies.

It is therefore a feature of this invention that an iris be positioned in the output waveguide of an oscillator capable of oscillating in more than one mode, the iris being resonant at the desired mode frequency and spaced from the oscillator to load heavily the undesired mode of oscillation.

It is another feature of this invention that the iris be positioned from a constant frequency oscillator or an oscillator tunable over a very narrow band so as to provide maximum transposition of the impedance of the iris at the output of the oscillator for the undesired mode of oscillation.

It is a further feature of this invention that two resonant irises be employed when the oscillator is tunable over a fairly wide band of frequencies, the irises being identical and being resonant at the upper end of the desired mode frequency band.

It is a still further feature of this invention when two irises are employed that the spacing between the irises be such as to attain impedance characteristic wherein the desired mode loading is only slightly affected by the introduction of the irises while the undesired mode loading is adversely affected by the irises. Further, in accordance with this feature, the two irises are positioned from the oscillator so that this composite adverse impedance characteristic is transposed to the output of the oscillator most effectively to load the undesired mode of oscillation.

A complete understanding of this invention and of the above noted and other features thereof may be gained from the following detailed description and the accompanying drawing, in which.

Figures 1, 2, 3, 4, 5:
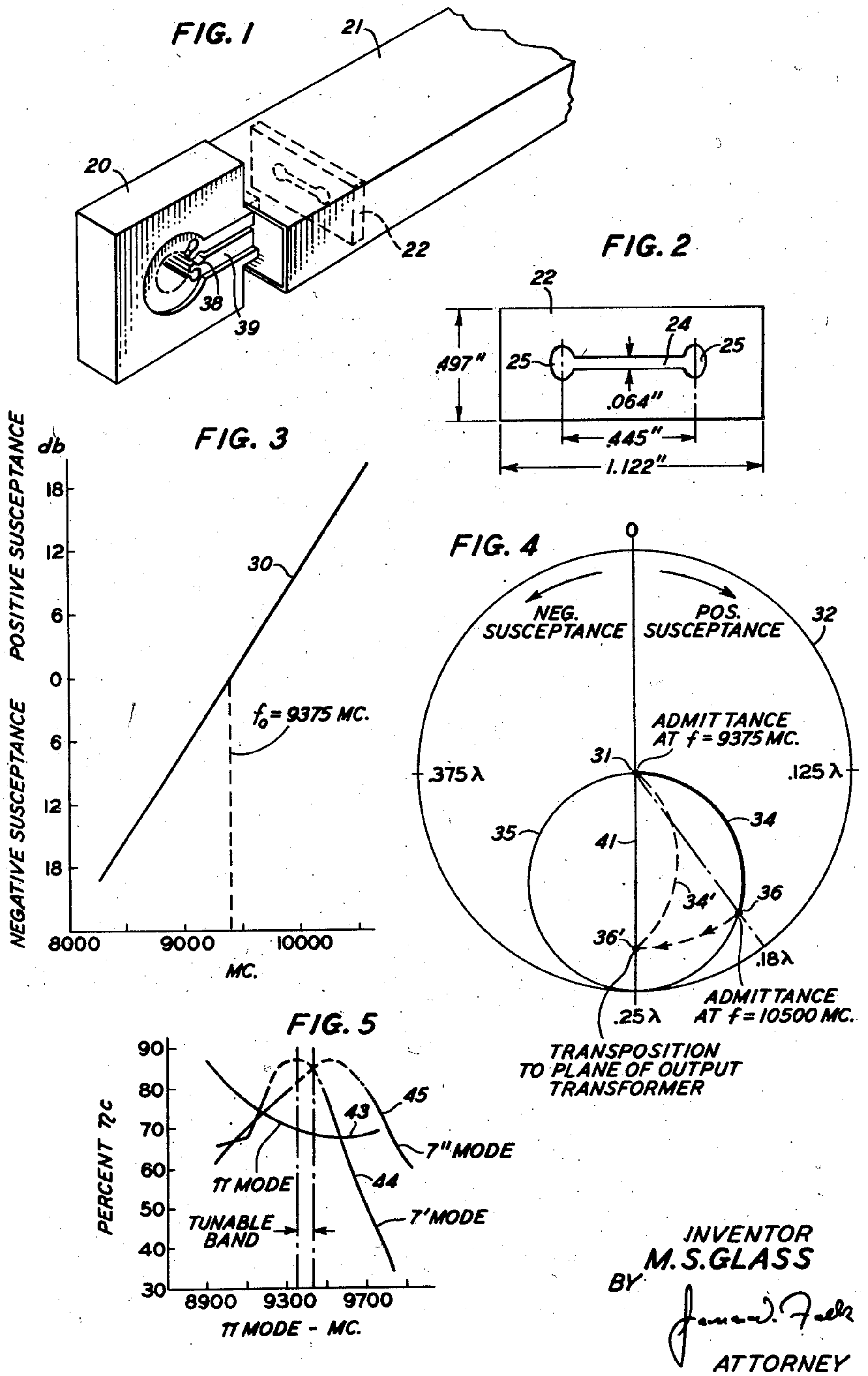
Fig. 1 is a schematic representation, in perspective, of one specific illustrative embodiment of this invention particularly adaptable to single frequency or narrow band oscillators.
Fig. 2 is a plan view of the resonant iris employed in the embodiment of Fig. 1.
Fig. 3 is a graph of the susceptance frequency characteristic for the iris of Fig. 2.
Fig. 4 is a partial Smith chart employed in determining some of the critical factors of the embodiment of this invention depicted in Fig. 1.
Fig. 5 is a graph of circuit loading for the desired and spurious modes of oscillation of the embodiment of this invention depicted in Fig. 1.

Referring now to Fig. 1, there is depicted one specific illustrative embodiment of this invention wherein a single resonant iris is employed selectively to load the doublet components of the spurious mode nearest in frequency to the π-mode of oscillation. In the figure only the anode block 20 of the magnetron, the output waveguide 21, and the resonant iris 22 are depicted. The magnetron may advantageously be of the type known as the 4J52, disclosed in Patent 2,466,922, issued April 12, 1949, to N. Wax.

The various critical factors that are arranged in the combination of this embodiment of the invention can best be understood from a discussion of the design procedure for determining them. These factors include the internal dimensions of the iris, the thickness of the iris, and the positioning of the iris from the magnetron output resonator. In the following discussion the frequency of the π-mode of the magnetron is assumed to be 9375 megacycles and the frequency of the degenerate mode 10,500 megacycles, which values are approximately those for the 4J52 magnetron.

The iris employed in this specific embodiment of the invention has the configuration and dimensions depicted in Fig. 2. The frequency of resonance of the iris is, of course, 9375 megacycles, and the dimensions of the slot 24 and end holes 25 can be determined readily by calculation, considering the iris as a double hole-and-slot resonator. By careful polishing out of the holes 25, to decrease the frequency, and of the slot 24, to increase the frequency, it is possible to adjust the frequency of resonance very closely to the desired value. The resonant frequency of the iris may be checked by placing it with a well-matched termination in a waveguide impedance measuring set. At resonance the iris does not disturb the match.

Fig. 3 is a graph of the line mismatch caused by inclusion of the iris 22 in the output waveguide 21 and shows the susceptance characteristic of the resonant iris. In the coordinate system of these curves susceptance is represented in terms of the standing wave it introduces in the line. This is convenient as it can be measured directly. The steepness of the slope of the line 30 determines the susceptance at neighboring frequencies. The iris depicted in Fig. 2 is particularly advantageous where the spurious mode frequency is close to the resonant frequency and therefore the curve 30 of Fig. 3 should be quite steep to assure a large susceptance at the degenerate mode frequency. High susceptance values, i. e., a steep curve 30 can be attained by employing a very narrow slot 24. Further control on the amount of susceptance introduced is attainable by varying the thickness of the metal septum. In this embodiment the iris thickness was 0.125 inch.

Fig. 4 is the skeleton of a Smith chart on which is plotted the graphic solution of the design of the iris of this specific illustrative embodiment of the invention. A Smith chart represents the complex admittance plane upon which are plotted contours of constant resistance and of constant reactance. On the chart the radial distances from the center represent reflection coefficients (or voltage standing wave ratios on a special non-linear scale) and angular distances represent lengths of transmission line. The Smith chart can be used either as an impedance chart or as an admittance chart; complete discussions of the Smith chart are known in the literature and are generally based on the article "Transmission line calculator" by P. H. Smith in "Electronics," January 1939, pages 29 et seq.

On the skeletonized chart of Fig. 4 there is included only the circle which bounds the complex admittance plane, the diametral line of pure resistance, and the $R=1$ circle. This $R=1$ circle is the locus of impedance values the resistive component of which is the characteristic impedance $Z_0$ of the transmission line. As only these portions of the chart are needed for the explanation of this embodiment of the invention, the other details of the chart are omitted to avoid confusing lines. In the following discussion the chart is considered to be an admittance chart so that the $R=1$ circle represents the admittance $Y_0$ of the transmission line; however, this discussion would be equally valid if the Smith chart were considered an impedance chart for a point a quarter wavelength away and we can therefore speak of either the admittance or impedance characteristic depicted on the Smith charts of Figs. 4, 9 and 10.

Since the iris 22 is very nearly free of dissipation, it will not modify the resistive component of the admittance of the line 21. Hence values of admittance resulting from the introduction of the iris 22 in the line 21 lie along the $R=1$ circle. As, in this specific embodiment, the iris is resonant at 9375 mc., the $\pi$-mode frequency of the magnetron 20, the introduction of the iris does not affect the susceptance of the line at that frequency. Accordingly the match point 31, at the center of the large circle 32 on the chart, represents the admittance at that frequency. At frequencies higher than the resonant frequency the iris 22 introduces positive susceptance in the line 21 and accordingly the points for higher frequencies define a segment 34 on the $R=1$ circle 35, the segment extending to the point 36 corresponding to an admittance of 10,500 megacycles, which, as noted above, is approximately the frequency of the spurious mode nearest in frequency to the $\pi$-mode in this particular magnetron and therefore the spurious mode which it is most advantageous to load heavily.

The location of the various points on segment 34 and of the point 36 can readily be found by choosing the decibel value of the susceptance for the iris 22 from the line mismatch plot of Fig. 3 and applying it to the decibel radial scale of the Smith chart, which scale is not depicted in the skeletonized chart of Fig. 4. The coincidence of this radial distance with the $R=1$ circle 35 locates the point.

In order to load the spurious mode it is necessary to determine the distance the iris 22 should be placed from the magnetron resonator 38, seen in Fig. 1. Advantageously a quarter wave output transformer 39 is positioned between the output resonator 38 and the output line 21, as is known in the art. Because of the length of this transformer the susceptance variations, which are described herein with reference to the plane of the output transformer at its end away from the magnetron, correspond to impedance variations at the output resonator itself. If desired, therefore, the position of the iris can either be determined from the output resonator or from the plane of the output transformer. The latter determination is generally made as the physical measurement of that distance is considerably easier.

Turning again to Fig. 4, the transposition of the susceptance to the plane of the output transformer is made, in terms of the Smith chart, by rotating the segment 34 clockwise through an angular distance until the point 36', corresponding to the point 36, is on the diametral line 41. The angular distance required for this rotation can be read off the Smith chart and in this instance the distance is $(.25-.18)\lambda$ or $0.07\lambda$, where the wavelength is that of the spurious mode (10,500 megacycles in this embodiment). The curve 34' therefore represents the admittance which would be measured at a point 0.07 closer to the oscillator. This spacing may be increased by one-half wavelength to 0.57 to avoid interference between fringing fields. Thus by positioning the iris at this distance from the end of quarter wave transformer or substantially $(0.32+n0.50)\lambda$, where $n$ is any integer, from the output resonator the desired spurious mode will be selectively heavily loaded while the $\pi$-mode is not loaded by the iris. It should be pointed out that as the iris is resonant at the $\pi$-mode frequency the iris will have no effect on $\pi$-mode loading regardless of its position in the waveguide. This can be seen on the Smith chart as the transposition of curve 34 comprises rotating the curve about the match point 31.

In this specific embodiment the iris 22 was thus spaced from the end of the transformer section 39 by a distance of 0.660 inch and was positioned within the vacuum envelope of the magnetron 20.

The graphs of Fig. 5 indicate the loading that can be attained by this specific embodiment of the invention. These curves were taken of the specific embodiment described above comprising a 4J52 magnetron whose doublet components of the 7-mode, the mode closest in frequency to the $\pi$-mode, were equally loaded, as described above. The degree of loading in this figure is expressed as percent circuit efficiency, curve 43 being for the desired $\pi$-mode and curves 44 and 45 for the doublet 7-mode components, referred to as the 7'-mode and the 7''-mode. As can be seen over a narrow band of frequencies the 7-mode is heavily loaded, the circuit efficiency being from 80 to 90 percent; without the iris positioned in the waveguide in accordance with our invention, the 7-mode loading would be considerably less than the $\pi$-mode loading, being of the order of 50 percent. An indication of the circuit efficiency without the single iris can be seen from Fig. 11, which is a plot of circuit efficiency of modes with no output filter for a slightly different tube over substantially the same frequency band. The efficiency of the 7-mode is substantially the same for both tubes.

It is therefore apparent that a single resonant iris in accordance with this invention provides a marked improvement in the loading of spurious modes for a fixed frequency oscillator or for an oscillator having a relatively narrow band of frequencies. On the graph of Fig. 5 the frequency limits specified for the 4J52 magnetron are depicted to illustrate this point.

Curves 44 and 45 are indicated by broken lines over their high efficiency portions because it is very difficult accurately to measure such high circuit efficiencies and there is accordingly a slight degree of uncertainty in the measurements at these points. Despite these quantitative uncertainties, however, it is apparent that over a band considerably wider than that specified for this particular magnetron, the spurious mode closest in frequency to the $\pi$-mode is much more heavily loaded than the $\pi$-mode.

Figures 6, 7:
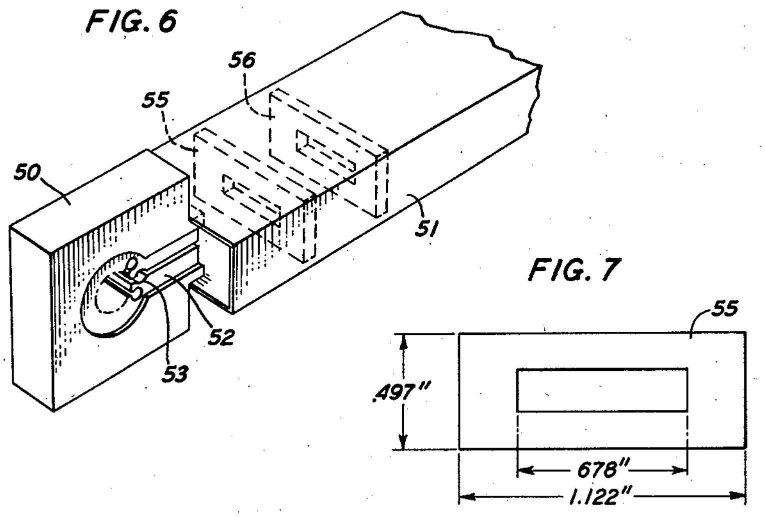
Fig. 6 is a schematic representation, in perspective, of another specific illustrative embodiment of this invention particularly adaptable to oscillators tunable over relatively wide bands.
Fig. 7 is a plan view of an iris employed in the embodiment of Fig. 6.

While the embodiment of this invention depicted in Fig. 1 and described above is usable only over a relatively narrow frequency band, some advantage may be attained in accordance with another specific illustrative embodiment of this invention employing a pair of resonant irises when the oscillator is tunable over a relatively wide band of frequencies. Turning now to Fig. 6 there is depicted an embodiment of this invention employable when the magnetron 50 is tunable over a wide band of frequencies. The magnetron 50 may be of the type disclosed in Patent 2,657,334 issued October 27, 1953, to J. W. West. An output waveguide 51 is connected by a quarter-wave transformer section 52 to the output resonator bore 53. Positioned in the waveguide 51, advantageously within the vacuum envelope of the magnetron, are a pair of identical resonant irises 55 and 56 in accordance with this invention. The shape and dimensions of the irises 55 and 56 for one specific embodiment are shown in Fig. 7, the irises in this embodiment being 0.062 inch thick.

Figure 8:
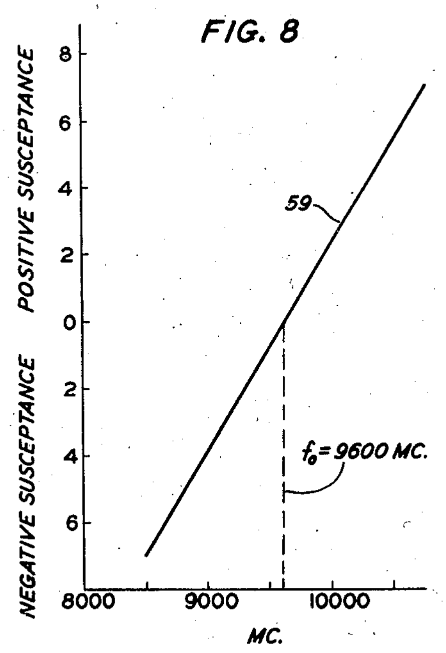
Fig. 8 is a graph of the susceptance frequency characteristic for the irises of Fig. 7.
Figure 9:
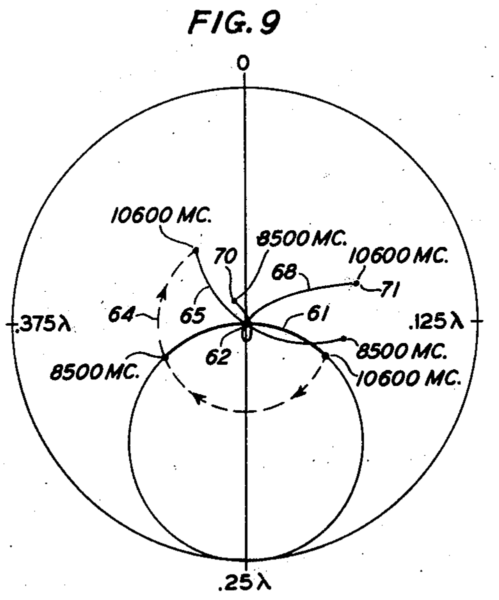
Figs. 9 and 10 are partial Smith charts employed in determining some of the critical factors of the embodiment of this invention depicted in Fig. 6.
Figure 10:
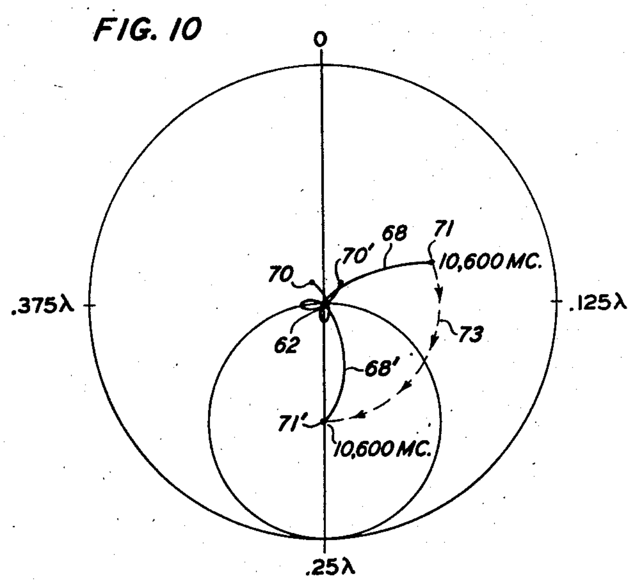

As before an appreciation of the critical parameters and positioning of the irises in accordance with this embodiment can best be understood from a discussion of the design procedure for one specific example. In this example a magnetron of the type disclosed in the above-mentioned West patent is assumed, having a $\pi$-mode frequency band of from 8500 to 9600 megacycles. The graph of the line mismatch for the iris depicted in Fig. 7 is shown in Fig. 8 and is represented by the line 59. Figs. 9 and 10 are skeletonized Smith charts of the type described above with reference to Fig. 4.

Turning now to Fig. 9, there are plotted the admittances of the two irises 55 and 56 at the plane of iris 55. Curve 61, which is a segment of the $R=1$ circle, is the admittance of the iris 55 nearest the oscillator 59 for a band of frequencies from 8500 to 10,600 magacycles. This band of frequencies covers the frequency range of both the $\pi$-mode and the nearest spurious mode. The match point 62 is determined by the resonant frequency of the irises 55 and 56 and in accordance with an aspect of this invention is the upper limit of the $\pi$-mode frequency band. In this embodiment the magnetron is tunable over a range of from 8,500 to 9,600 megacycles and therefore the match point is at 9,600 megacycles.

The admittance characteristic of the more remote iris 56 is identical with that of iris 55 and, in its own plane, would appear as curve 61. However, that characteristic must be transposed to the plane of the closer iris 55 and is therefore rotated through an angular distance which corresponds to the distance between the irises, as shown by the arrowed-line 64. The rotated characteristic for iris 56 is curve 65 in Fig. 9. When the admittances of the two irises are thus located in the same transverse plane of the waveguide 51, they are effectively in parallel across the line at that plane. Thus they set up a resultant admittance which is the algebraic sum of the admittances due to the individual irises.

Accordingly by adding each point on curve 65 to the point of that frequency on curve 61, the curve 68 corresponding to the actual admittance of the irises 55 and 56 at the plane of the iris 55 is determined. By looking at this curve 68 there can readily be observed the desiderata which determine the spacing between the irises 55 and 56. The $\pi$-mode frequency range is from the lower frequency end of curve 68 to the match point 62 and, in this embodiment, is from 8500 to 9600 megacycles. The spacing between the irises should be such that, when the admittances are added together, the composite admittances in this range are points on curve 68 closely surrounding the match point, which is the point of no loading. As can be seen in Fig. 9 the curve 68 has a small loop adjacent the match point, which loop includes the entire $\pi$-mode frequency band. Further, as will be apparent from Fig. 10, the low frequency point 69 and the farthest point of this loop should be approximately on a straight line. The spacing between the irises 55 and 56 is therefore chosen so that when the transposed admittance of the iris 56 is added to the admittance of iris 55 the resultant admittance curve has these characteristics.

The distance of the iris 55 from the plane of the output transformer 52 is also determined by the angular distance required to transpose the admittance curve 68 along the arrowed-line 73 so that the high frequency point 71 of curve 68 lies on the diametral line. As pointed out above with reference to the prior embodiment, this admittance is transposed by the quarter-wave transformer matching section 52 to an impedance characteristic having the same relative distribution of values at the output resonator 53 of the magnetron 50. Thus the relative loading of the magnetron at various frequencies in the band may be deduced directly from the characteristic depicted by curve 68′, considering curve 68′ to be either an admittance characteristic at the output of the transformer 52, or an impedance characteristic at the magnetron itself.

Referring again to curve 68′ it can be noted that at the lower end 70′ of the $\pi$-mode frequency range the loading is outside the $R=1$ circle and is therefore somewhat lighter than normal. It rather quickly drops, as the frequency increases, to the match point 62 and then over the remainder of the $\pi$-mode range it forms a closed loop closely hugging the $R=1$ circle, which circle represents normal resistive loading of the magnetron. When the frequency goes above match point and therefore above the upper limit of the $\pi$-mode frequency range, the impedance circle swings into the region of heavy loading inside the $R=1$ circle. The spacing between the two irises 55 and 56 is therefore determined to have this closed loop, when transposed to the magnetron output, along the $R=1$ circle.

It is therefore apparent that by employing a pair of irises resonant at the upper frequency of the $\pi$-mode range and separated from the output resonator of the magnetron and from each other in accordance with aspects of this invention, the $\pi$-mode loading of the magnetron stays fairly constant over the $\pi$-mode frequency range except for a small "unloading" effect at the low frequency end. This effect at the low frequency end may be useful in flattening the output power characteristic. It is also apparent that if the frequency range and intrinsic mode separation of the oscillator is such that the low frequency end of the spurious mode range very nearly coincides with the high frequency end of the $\pi$-mode range very little improvement in spurious mode loading can be expected in that region. However, for higher spurious mode frequencies the spurious mode loading is substantially increased, as is apparent from Fig. 10.

In this specific embodiment, the spacing between the irises 55 and 56 was 0.440 inch and the iris 55 was spaced from the end of the output transformer section 52 by a distance of 0.160 inch. The particular iris configuration employed, readily seen in Fig. 7, has a relatively low slope susceptance curve which is desirable when the separation between the mode frequency ranges is very slight, as discussed further below. The resonant frequency of the iris can be readily determined by variations in the dimensions of the rectangular aperture in the iris, an increase in a major dimension lowering the frequency of resonance and an increase in a minor dimension raising the frequency of resonance.

Figure 11:
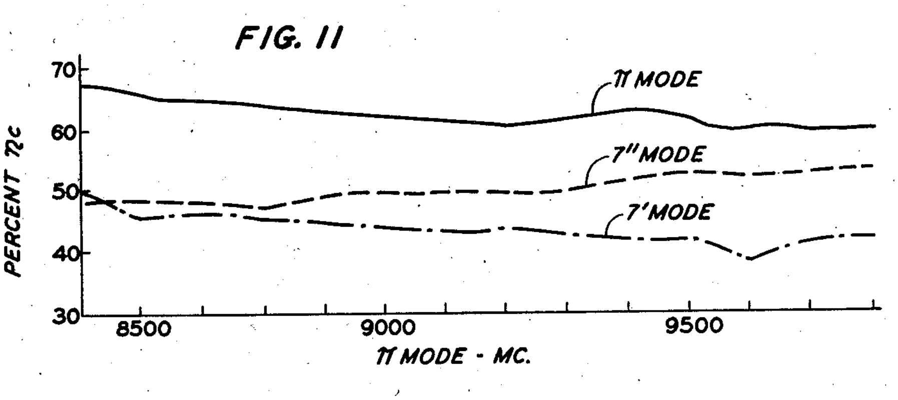
Fig. 11 is a graph of circuit loading for the desired and spurious modes of oscillation of a tunable magnetron not incorporating this invention.
Figure 12:
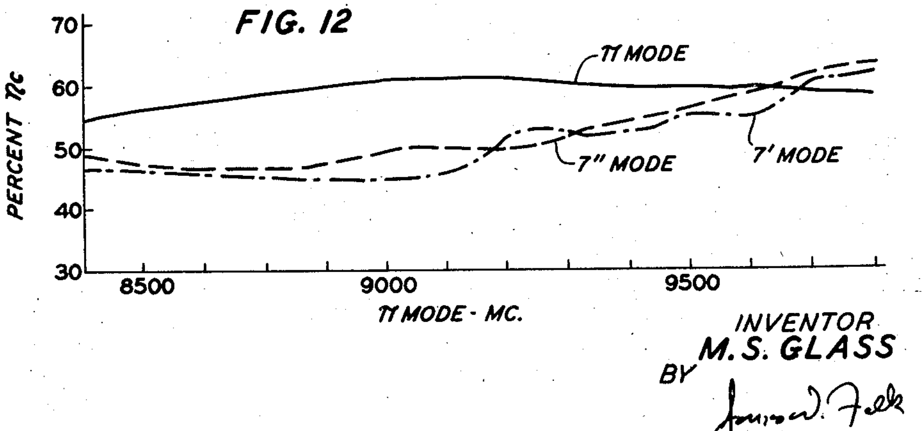
Fig. 12 is a graph of circuit loading for the desired and spurious modes of oscillation of a tunable magnetron in accordance with the embodiment of Fig. 6.

The improvement attained by this invention can be seen in Figs. 11 and 12 wherein a magnetron of the type disclosed in the above mentioned West patent was tunable over the wide range of frequencies from 8500 to 9600 megacycles and the closest spurious mode, the 7-mode, had its lower end almost coinciding with the upper frequency end of the $\pi$-mode. In Fig. 11 there is depicted the amount of loading, expressed in terms of circuit efficiency, over the $\pi$-mode frequency band of the doublet 7-mode components, identified as the 7′ and 7″ modes, and the $\pi$-mode in a resonator structure which has been modified to equalize the loading of the 7-mode components, as described above. In Fig. 12 there is depicted the same curves for the magnetron after a suitable double resonant iris filter has been inserted in the output, in accordance with this invention. It will be noted in Fig. 12 that while the 7-mode circuit efficiency has not been increased much at the low frequency end of the band, the $\pi$-mode coupling has been reduced so that the relation between the two has become more favorable to the starting of the $\pi$-mode oscillations. The loading of the 7-modes becomes greater as the frequency is increased so that at the high frequency end of the band they are loaded more heavily than the $\pi$-mode. While this increase in loading is modest, as compared to that which may be attained in a single frequency or narrow frequency band magnetron, its effect on performance is nevertheless considerable. Further these curves of Figs. 11 and 12 are for the most adverse case where there is substantially no frequency separation between the $\pi$-mode frequency range and the 7-mode frequency range. In other embodiments wherein there is a greater separation of mode frequencies inherent in the oscillator itself, the selective increase in loading of the spurious modes is of course considerably greater.

It is to be understood that the above described arrangements are illustrative of the application of the principles of the invention. Numerous other arrangements may be devised by those skilled in the art without departing from the spirit and scope of the invention.

What is claimed is:

1. In combination, a generator of ultra-high frequency capable of oscillating in more than one mode, output means including an output waveguide connected to said generator, and means for assuring build-up of oscillation in said generator in a preferred mode, said last-mentioned means including an iris filter positioned transversely in said waveguide, said iris filter being resonant at a frequency of said desired preferred mode and positioned from said generator a predetermined, distinct electrical distance so as to load a spurious mode of oscillation.

2. In combination, a magnetron capable of oscillating in more than one mode and having a plurality of cavity resonators, an output waveguide coupled to one of said resonators, and an iris filter positioned in and across said waveguide, resonant at a $\pi$-mode frequency of the magnetron and positioned from said one resonator a predetermined, distinct electrical distance so as to load a spurious mode of oscillation.

3. In combination, a magnetron for generating power in a restricted frequency range but capable of oscillating in more than one mode, an output waveguide coupled to said magnetron, and an iris filter positioned transversely in said waveguide, resonant in said restricted frequency range, and positioned from said magnetron a predetermined, distinct electrical distance so as to load heavily a spurious mode of oscillation.

4. In combination, a generator of ultra high frequency power in a restricted frequency range but capable of oscillating in more than one mode, an output waveguide coupled to said generator, and means for assuring build-up of oscillation in a preferred mode, said means including an iris filter positioned transversely in said waveguide and dimensioned to be resonant in said restricted frequency range, said iris being spaced from said generator a predetermined, distinct electrical distance so as to load heavily a spurious mode of oscillation.

5. In the combination of claim 4, said iris being spaced from said generator an electrical distance so that the impedance characteristic of said iris on a Smith chart when rotated through said electrical distance has the point on said characteristic corresponding to said spurious mode frequency transposed to the diametral line of said Smith chart.

6. In combination, a generator of ultra-high frequency power over a relatively wide frequency range and capable of oscillating in more than one mode, an output waveguide coupled to said generator, and means for assuring build-up of oscillation in a preferred mode, said means including a pair of iris filters positioned in and across said waveguide and dimensioned to be resonant in said frequency range, said irises being spaced from each other and from said generator so that the impedance of said irises transposed to said generator loads a spurious mode of oscillation but has substantially little effect in loading a desired mode of oscillation.

7. In the combination of claim 6, said irises being identical and being resonant at the upper frequency of said frequency range.

8. In combination, a magnetron tunable over a relatively wide frequency band and capable of oscillating in more than one mode, an output waveguide coupled to said magnetron, and a pair of iris filters positioned in and across said waveguide, each dimensioned so as to be resonant at the upper frequency of said band, and positioned from said magnetron so as effectively to load a spurious mode of oscillation while having substantially little effect on the desired $\pi$-mode of oscillation.

9. In combination, a magnetron, an output waveguide coupled to said magnetron, and means positioned in said waveguide to prevent moding of said magnetron, said means comprising a transverse metallic plate defining an iris filter, said iris filter being resonant at the $\pi$-mode frequency of said magnetron and being spaced therefrom a predetermined, distinct electrical distance so that the impedance of said iris at a spurious mode frequency is transposed to said magnetron heavily to load said spurious mode.

10. In the combination of claim 9, said transverse metallic plate having a pair of apertures therein connected by a slot, said slot being narrow and said plate having a thickness so that said iris defined thereby has a steep susceptance-frequency characteristic.

11. In the combination of claim 9, said iris being spaced from the output of said magnetron an electrical distance such that the impedance characteristic of said iris on a Smith chart when rotated through said electrical distance has the spurious mode point on said characteristic transposed to the diametral line of the Smith chart.

12. In combination, a magnetron tunable over a band of frequencies, an output waveguide coupled to said magnetron, and means positioned in said waveguide to prevent moding of said magnetron, said means comprising a pair of transverse metallic plates defining iris filters resonant at the upper frequency of said band of frequencies of said magnetron and spaced from said magnetron an electrical distance so that the composite impedance of said irises when transposed to said magnetron selectively loads a spurious mode of oscillation over said band of frequencies.

13. In the combination of claim 12, said metallic plates being identical and each having a substantially rectangular aperture therein, the thickness of said plates being such that said irises have relatively slowly rising susceptance-frequency characteristics.

14. In the combination of claim 12, said irises being spaced from each other so that the sum of the impedance characteristic of the more remote iris and the impedance characteristic of the iris nearer the magnetron at the plane of the nearer iris is a curve on the Smith chart adjacent the match-point of the chart over the desired band of frequencies and removed therefrom over the band of frequencies of a spurious mode and said nearer iris being spaced from said magnetron such that said curve is rotated on said Smith chart so that the portion defining the spurious mode frequencies is within the R=1 circle and the portion defining the desired mode frequencies is substantially along the R=1 circle at the plane of the output of said magnetron.

References Cited in the file of this patent

UNITED STATES PATENTS

| | | |
|---|---|---|
| 2,523,841 | Nordsieck | Sept. 26, 1950 |
| 2,582,205 | Longacre | Jan. 8, 1952 |
| 2,644,889 | Finke et al. | July 7, 1953 |